Figure 5:
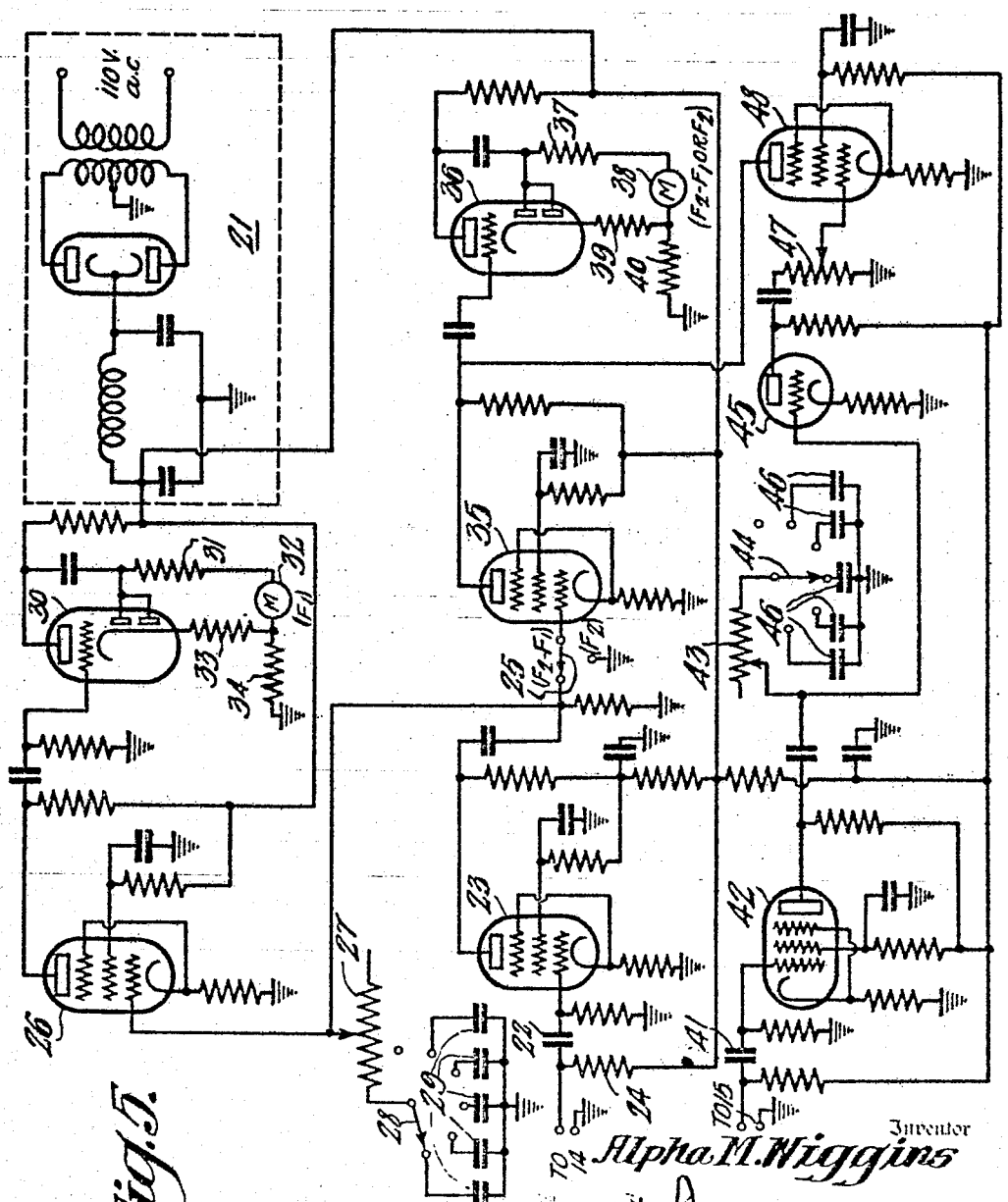

Aug. 8, 1944.   A. M. WIGGINS   2,355,194
MECHANICAL IMPEDANCE MEASURING DEVICE
Filed March 30, 1943   3 Sheets-Sheet 1
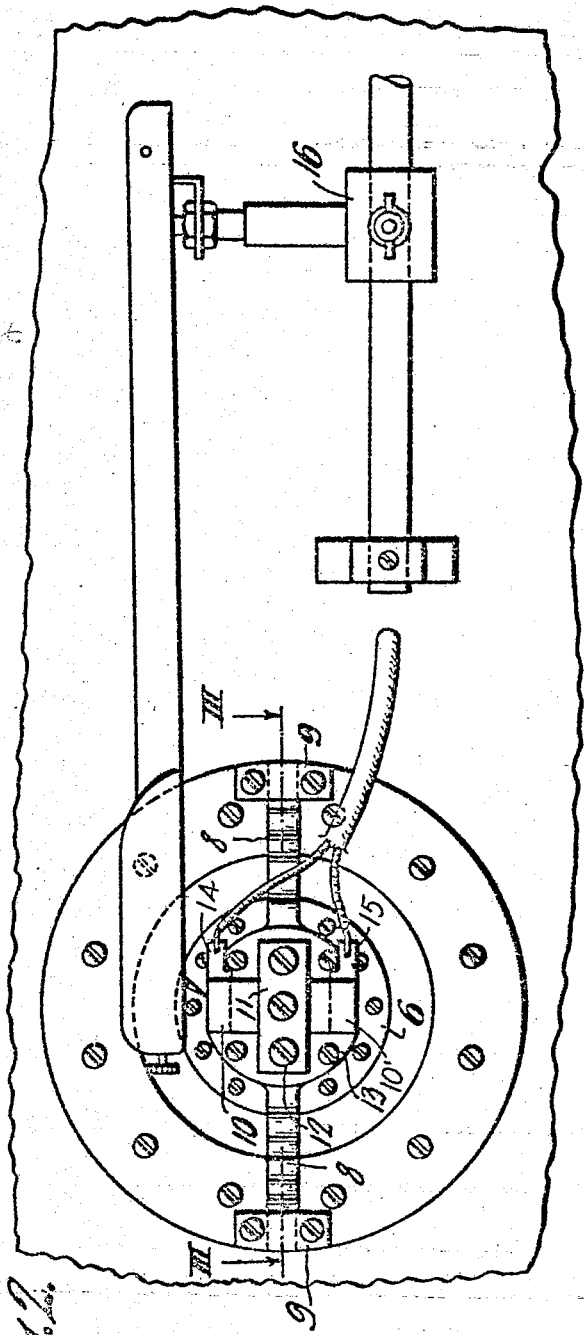
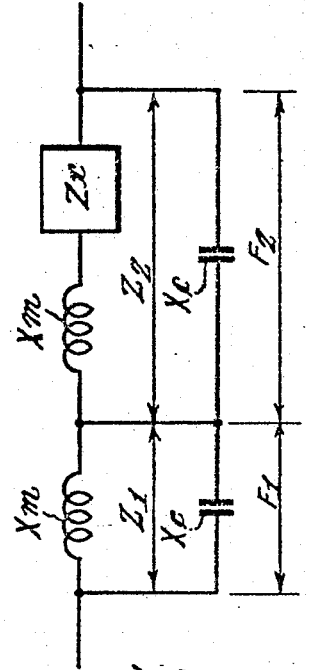
Inventor
Alpha M. Wiggins
By
Attorney

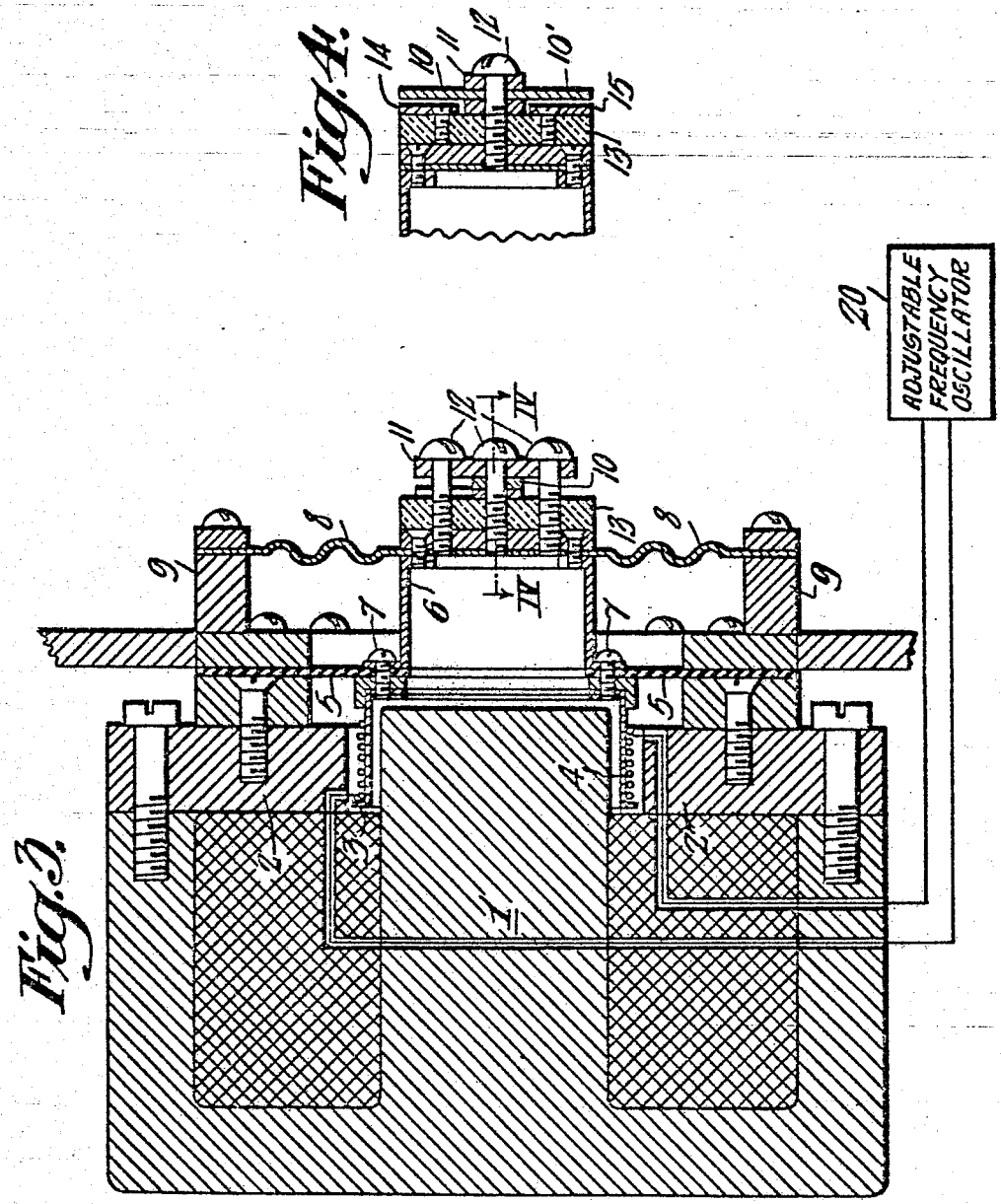

Patented Aug. 8, 1944

2,355,194

UNITED STATES PATENT OFFICE 2,355,194

MECHANICAL IMPEDANCE MEASURING DEVICE

Alpha M. Wiggins, Princeton, N. J., assignor to Radio Corporation of America, a corporation of Delaware Application March 30, 1943, Serial No. 481,119

10 Claims. (Cl. 73—51)

This invention relates generally to apparatus for measuring mechanical impedance and more particularly to a device for determining the mechanical impedance of vibrating systems such as armatures, diaphragms, suspensions or sound translating devices.

If two substantially identical metallic reeds are driven by the same source and caused to vibrate in phase, fixed conductive plates disposed adjacent the vibrating reeds may provide separate variable capacitors analogous to condenser microphones. If similar amplifying devices are connected to the separate reeds and their associated fixed capacitive plates, the output of the two amplifiers will be substantially identical in frequency, amplitude and phase. If an additional mechanical element such as, for example, a device of which the mechanical impedance is to be determined, is applied to load one of the reeds, the amplitude and phase of vibration of the reed will be substantially changed. Since the mass and compliance of the reeds may be determined readily, the mechanical impedance of the loading device may be calculated from the difference in amplitude and phase of the signals from the loaded and unloaded vibrating reeds.

If a reed, clamped at one end with the other end free, is driven at the clamped end by alternating force, the displacements of the free end from the neutral position will be proportional to the applied force and the compliance of the reed. The force acting on the reed will be the effective mass times the acceleration. The effective mass of a reed clamped at one end is one-fourth of its total mass. The equivalent circuit is a mass of one-fourth the total mass, shunted by a compliance, which is equal to $$\frac{4L^3}{Eba^3}$$

where $L$ is the length of the reed, $E$ the Young's modulus, $b$ the width and $a$ the thickness of the reed. If two identical reeds are driven by the same force, the displacements of the free ends will be in phase and equal. Their relative displacements will therefore be zero. If one reed is then loaded with a mechanical impedance at its free end, the relative displacements will be proportional to the driving force, the mechanical impedance of the loading devices, the masses and the compliances of the reeds.

In a preferred modification of the invention, to be described in detail hereinafter, the two reeds form the ground plates of condensers and may comprise a single reed rigidly clamped at its center. The high potential capacitive plates disposed adjacent the free ends of the reeds are fastened rigidly to the driving mechanism. This driving mechanism may comprise a conventional sound translating device such as, for example, a dynamic loudspeaker unit. The dimensions of the vibrating reeds are selected to provide suitable constants at the driving frequency. The driving unit may be actuated by applying thereto the output of a conventional audio frequency generator. The driving coil may be rigidly connected in any conventional manner to the clamped end of the vibrating reeds. A high potential is applied across the electrodes of the separate condensers through high resistance circuits, and the separate condensers are connected to amplifiers which include suitable indicating circuits.

The outputs of the amplifiers will be proportional to the displacements of the reeds, which in turn are proportional to the product of the driving force and the compliance. The signals from the two amplifiers are mixed in phase opposition, so that when the reeds are driven with no load applied to either reed, the two signals may be cancelled. After the signals are balanced, and a load is applied to the free end of one of the reeds, the mixed signal will be proportional to the vectorial difference between the force on the loaded reed and the force on the unloaded reed. The mechanical impedance in ohms of the load will be proportional to the ratio of the mixed signal with one reed loaded and the signal from the unloaded reed.

Among the objects of the invention are to provide an improved means for measuring the mechanical impedance of a mechanical element. Another object is to provide an improved method of and means for measuring the mechanical impedance of a mechanical element wherein the loading effect of the mechanical element upon one of two substantially identical reeds is measured and the mechanical impedance calculated from the vectorial difference in displacement of the two reeds. Another object of the invention is to provide an improved method of and means for measuring the mechanical impedance of a mechanical element wherein two vibratory reeds provide electric potentials which may be balanced and wherein the mechanical element is caused to load one of the reeds, thereby unbalancing the potentials derived from said reeds.

The invention will be described in greater detail by reference to the accompanying drawings of which Figure 1 is a schematic circuit diagram of the equivalent circuit of the loaded and unloaded vibratory reeds; Figure 2 is an elevational view of one embodiment of the invention, Figure 3 is a cross-sectional view along the section III, III of a portion of Figure 2, Figure 4 is a sectional view of Figure 3 along the section IV, IV and Figure 5 is a schematic circuit diagram of the electrical circuit associated with the device illustrated in Figures 2, 3 and 4. Similar reference numerals are applied to similar elements throughout the drawings.

Referring to Figure 1, the equivalent circuit of the vibratory reeds includes a loading device such as a phonograph pickup. The unknown impedance $Z_x$ of the load may be calculated by using the ratio of the forces, and the masses and compliances of the reeds. $X_m$ represents the reactance of the mass of either reed, $X_c$ the reactance of the compliance of either reed, $Z_1$ the equivalent impedance of the parallel mass and compliance of the unloaded reed, $Z_2$ the equivalent impedance of the mass of the loaded reed in series with the unknown impedance and shunted by the compliance of the loaded reed, $F_1$ the force on the unloaded reed as represented by the capacity variations it provides, and $F_2$ the force on the loaded reed as represented by the capacity variations which it provides.

(1) $$Z_1 = \frac{X_m X_c}{X_c + X_m}$$

(2) $$Z_2 = \frac{(X_m + Z_x) X_c}{X_c + X_m + Z_x}$$

(3) $$Z_2 - Z_1 = \frac{(X_m + Z_x) X_c}{X_c + X_m + Z_x} - \frac{X_m X_c}{X_c + X_m}$$
$$= \frac{Z_x X^2_c}{X^2_c + 2 X_c X_m + X^2_m + Z_x X_c + Z_x X_m}$$

(4) $$\frac{Z_2 - Z_1}{Z_1} = \frac{Z_x X^2_c (X_c + X_m)}{(X^2_c + 2 X_c X_m + X^2_m + Z_x X_c + Z_x X_m) X_m X_c}$$
$$= \frac{X_c Z_x}{X^2_m + X_c X_m + Z_x X_m}$$

(5) $$Z_x \left[ 1 - \frac{(Z_2 - Z_1) X_m}{Z_1 X_c} \right] = \frac{(Z_2 - Z_1) X_m}{Z_1} + \frac{(Z_2 - Z_1) X^2_m}{Z_1 X_c}$$

If (6) $$\frac{(Z_2 - Z_1) X_m}{Z_1 X_c} \ll 1$$

which is true for frequencies well below the resonant frequency of the reed: the equation becomes:

(7) $$Z_x = \frac{(Z_2 - Z_1)}{Z_1} \left[ X_m + \frac{X^2_m}{X_c} \right]$$

$X_m$ is 180° out of phase with $$\frac{X^2_m}{X_c}$$

so eliminating the vector quantities and using only the numerical quantities, the equation becomes:

(8) $$|Z_x| = \frac{Z_2 - Z_1}{Z_1} \left[ X_m - \frac{X^2_m}{X_c} \right]$$

Since $$\frac{F_2}{F_1} = \frac{Z_2}{Z_1}$$

the equation may be written:

(9) $$|Z_x| = \frac{F_2 - F_1}{F_1} \left[ X_m - \frac{X^2_m}{X_c} \right]$$

if, however, $$\frac{(Z_2 - Z_1) X_m}{Z_1 X_c}$$

is not small in comparison to 1. The full equation,

(10) $$Z_x \left[ 1 - \frac{(F_2 - F_1)}{F_1 X_c} X_m \right] = \frac{(F_2 - F_1)}{F_1} \left[ X_m + \frac{X^2_m}{X_c} \right]$$

must be taken into consideration with the phase relations. This equation will give the phase angle as well as the magnitude of the mechanical impedance.

In operating the mechanical impedance bridge, a reed adapted to be clamped at its center is selected for the frequency range desired and placed on the driving mechanism which is driven at the frequency at which the measurement is to be made. With both reeds unloaded, the amplifier outputs are balanced by adjusting the voltage amplitude of one until a substantially perfect balance is obtained. Then the load is applied to one of the vibrating reeds and the amplifier outputs noted. The mechanical impedance may then be calculated from the equation:

(11) $$Z_x = \frac{F_2 - F_1}{F_1} \left[ X_m - \frac{X^2_m}{X_c} \right]$$

In order to facilitate the calculation of the mechanical impedance by this formula, curves may be plotted of $$\left( X_m - \frac{X^2_m}{X_c} \right)$$

versus frequency for each reed, whereby the ratio $$\frac{(F_2 - F_1)}{F_1}$$

may be multiplied by the quantity determined from the suitable curve.

With the apparatus to be described, mechanical impedance measurements over a range of from two hundred to several thousand mechanical ohms may be made with an accuracy of plus or minus 15 percent in the mid-frequency range of 500 to 5,000 cycles. At the lower and higher limits of the frequency range, the accuracy will be somewhat less, although reliable measurements may be made at frequencies up to and including 8,000 cycles. For frequencies below 500 cycles, the reeds should preferably be made of brass, while for higher frequencies aluminum is preferable. In all cases, the reeds should be clamped tightly to the driving unit. The unitary construction of the reeds to be described hereinafter facilitates rigid clamping.

Referring to Figures 2, 3 and 4, a driving unit comprising a conventional loudspeaker field assembly having a core 1 and pole pieces 2 provides a strong magnetic field across an air gap 3. It should be understood that the magnetic field may be provided by a permanent magnet or an electromagnet as desired. A conventional electrodynamic driving coil 4 is supported by a flexible rubber diaphragm 5 in the air gap 3. The diaphragm may be supported in any desired manner by the field structure. A cylindrical metallic driving member 6 is mounted rigidly to the driving coil 4 and diaphragm 5 by means of rivets 7. Additional stiffness and support may be provided for the driving member 6 by means of a corrugated metallic supporting strip 8 which extends to suitable studs 9 attached to the field structure. A pair of reeds comprising a single metallic plate 10, 10' clamped at its center by means of a clamp 11, is attached rigidly to the end of the cylindrical driving member 6, by means of clamping screws 12.

An insulating support 13 is fastened to the end of the cylindrical driving element 6 between the end of the driving element and the clamped reed. A first fixed capacitive plate 14 is secured to the insulating member 13 adjacent one end of the clamped reeds 10, 10' and a second fixed capacitive element 15 is similarly secured to the insulating element 13 adjacent the other free end of the clamped reed 10', whereby the two free ends of the clamped reed provide separate variable capacitive devices. An adjustable frequency oscillator, or other suitable source of driving power, 20 is connected to the driving coil 4.

The device of which the mechanical impedance is to be determined, in this instance a conventional phonograph pickup, is adjustably mounted upon a suitable support 16 so that the phonograph needle of the pickup may be inserted in a small depression in the free end of one of the vibrating reeds. It should be understood that the phonograph pickup includes the conventional tone arm customarily employed with such devices, and that the customary tone arm mounting would be supported rigidly by the adjustable support 16 in order that the mechanical impedance measurements might be comparable to measurements taken under actual operating conditions.

Referring to Figure 5, the thermionic tube circuit, employed in combination with the electromechanical device described heretofore, includes a pair of amplifiers, one for each of the variable capacitor devices associated with the vibrating reeds. A power supply 21 of conventional design supplies operating potentials for the various amplifier thermionic tubes. The fixed capacitive electrode 14 is connected through a first coupling capacitor 22 to the control electrode of a first amplifier tube 23. A high potential is applied to the capacitor electrode 14 through a high resistance 24 which is connected to the output of the power supply 21.

The output of the first amplifier tube 23 is connected to a fixed contact of a first switch 25 and to the control electrode of a second amplifier tube 26. The control electrode circuit of the second amplifier tube 26 includes a variable resistor 27 which is also connected to the movable contact of a second switch 28. The fixed contacts of the second switch 28 are connected respectively to a plurality of graduated fixed capacitors 29. The remaining terminals of the fixed capacitors 29 are connected to ground.

The output of the second amplifier 26 is coupled in a conventional manner to a control electrode of a tube 30 which is of the double diode-triode type. The anodes of the two diodes are connected together and connected through a third resistor 31 to one terminal of a first indicating meter 32. The remaining terminal of the indicating meter 32 is connected to the cathode of the diode-triode tube 30 through a cathode resistor 33. It is also connected to ground through a fourth resistor 34.

The remaining fixed contact of the first switch 25 is connected to ground. The movable contact of the switch 25 is connected to the control electrode of a third thermionic tube amplifier 35. The anode of the third thermionic amplifier tube 35 is coupled to the control electrode of a second double diode-triode tube 36. The two anodes of the diodes of the diode-triode tube 36 are connected together and connected through a fifth resistor 37 to a second indicating meter 38. The remaining terminal of the second indicating meter 38 is connected to the cathode of the double diode-triode tube through a second cathode resistor 39, and is connected to ground through a sixth resistor 40.

The second fixed capacitor electrode 15 is connected through a second coupling capacitor 41 to the control electrode of a fourth amplifier tube 42. The anode of the fourth amplifier tube 42 is coupled to a second variable resistor 43 and to the control electrode of a fifth amplifier tube 45. The remaining terminal of the second variable resistor 43 is connected to the movable contact of a third switch 44. The fixed contacts of the third switch 44 are connected respectively to separate graduated fixed capacitors 46. The remaining terminals of the capacitors 46 are connected to ground. The output of the fifth amplifier tube 45 is connected across a potentiometer 47. The movable contact of the potentiometer 47 is connected to the control electrode of a sixth amplifier tube 48. The anode of the sixth amplifier tube 48 is connected to the anode of the third amplifier tube 35.

It should be understood that the first variable resistor 27 and second switch 28 with its associated capacitors 29 comprise a phase control for the amplifier system including the tubes 23, 26 and 30. Likewise, the second variable resistor 43, the third switch 44 with its associated capacitors 46, comprise a phase control for the second amplifier including the tubes 42, 45, 48 and 36.

The first switch 25 controls the application of signals from the first fixed capacitor electrode 13 to the third amplifier tube 35.

In operation, if the movable contact of the first switch 25 is connected to ground, the first meter 32 will provide an indication which is characteristic of the vibration of the end of the reed 10 adjacent the first fixed capacitor electrode 14; and the second meter 38 will provide indication characteristic of the vibration of the reed 10' adjacent the second fixed capacitive electrode 15. If the movable contact of the first switch 25 is connected to the ungrounded fixed switch terminal, signals derived from the first fixed capacitive electrode 14 will also be applied to the diode-triode tube 36, and the indication on the second meter 38 will be proportional to the difference between the signals derived from the two reeds. With both reeds unloaded by any external mechanical device, the outputs of the two capacitive pickup devices may be balanced as to amplitude by adjusting the position of the movable contact of the potentiometer 47. Similarly, the phases of the signals derived from the two reeds may be balanced by adjusting the first variable resistor 27 and the movable contact of the second switch 28, or by adjusting the second variable resistor 43 and the movable contact of the third switch 44. Provision is made for shifting the phases of the signals derived from the separate reeds, because of a slight rocking motion which may occur in the driving mechanism at some frequencies. This rocking motion provides a small phase displacement between the signals which would prevent the cancellation or balancing of no-load signals. After the circuit is balanced for the signals derived from both unloaded reeds, one of the reeds is loaded and the readings then derived from the first and second meters 32, 38, respectively, are substituted in Equation 11 to determine the mechanical impedance of the load.

Thus the invention described comprises a relatively simple and highly accurate method of and means for determining the mechanical impedance of mechanical elements by utilizing the loading effect of said elements upon one of a pair of vibrating reeds which are connected to a balanced electrical circuit.

I claim as my invention:

1. Apparatus for measuring the mechanical impedance of a movable mechanical element wherein said apparatus includes a vibratory driving device, means for connecting to said device a source of power for actuating said vibratory device at a predetermined frequency, a pair of similarly tuned vibratory elements having substantially equal predetermined inertias and compliances, one of said pair of vibratory elements having means adapted to receive said mechanical element to be measured, means including said driving device for providing forced vibration of both of said tuned elements, means for deriving potentials in response to said vibration of said tuned elements, means for balancing said potentials, means for supporting said movable mechanical element in operable relation with said one of said tuned elements to load said element to provide unbalance of said potentials, and means for indicating said mechanical impedance of said movable mechanical element in terms of said unbalanced potentials and said predetermined inertias and said compliances of said tuned elements.

2. Apparatus for measuring the mechanical impedance of a movable mechanical element wherein said apparatus includes a vibratory driving device, means for connecting to said device a source of power for actuating said vibratory device at a predetermined frequency, a pair of similarly tuned vibratory elements having substantially equal predetermined inertias and compliances, one of said pair of vibratory elements having means adapted to receive said mechanical element to be measured, means including said driving device for providing forced vibration of both of said tuned elements, means including a pair of reactive pickup elements for deriving potentials in response to said vibration of said tuned elements, means for balancing said potentials, means for supporting said movable mechanical element in operable relation with said one of said tuned elements to load said element to provide unbalance of said potentials, and means for indicating said mechanical impedance of said movable mechanical element in terms of said unbalanced potentials and said predetermined inertias and said compliances of said tuned elements.

3. Apparatus for measuring the mechanical impedance of a movable mechanical element wherein said apparatus includes a vibratory driving device, means for connecting to said device a source of power for actuating said vibratory device at a predetermined frequency, a pair of similarly tuned vibratory elements having substantially equal predetermined inertias and compliances, one of said pair of vibratory elements having means adapted to receive said mechanical element to be measured, means including said driving device for providing forced vibration of both of said tuned elements, means including a pair of reactive pickup elements for deriving potentials in response to said vibration of said tuned elements, means including a balanced thermionic tube amplifier for balancing said potentials, means for supporting said movable mechanical element in operable relation with said one of said tuned elements to load said element to provide unbalance of said potentials, and means for indicating said mechanical impedance of said movable mechanical element in terms of said unbalanced potentials and said predetermined inertias and said compliances of said tuned elements.

4. Apparatus of the type described in claim 1 including means for controlling separately the amplitudes of each of said potentials.

5. Apparatus of the type described in claim 1 including means for controlling separately the phases of each of said potentials.

6. Apparatus of the type described in claim 3 including means for controlling separately the amplitudes of said potentials and means for adjusting separately the phases of said potentials.

7. Apparatus for measuring the mechanical impedance of a movable mechanical element wherein said apparatus includes a vibratory driving device, means for connecting to said device a source of power for actuating said vibratory device at a predetermined frequency, a pair of similarly tuned vibratory elements having substantially equal predetermined inertias and compliances, one of said pair of vibratory elements having means adapted to receive said mechanical element to be measured, means including said driving device for providing forced vibration of both of said tuned elements, means including a pair of capacitive pickup elements for deriving potentials in response to said vibration of said tuned elements, means for balancing said potentials, means for supporting said movable mechanical element in operable relation with said one of said tuned elements to load said element to provide unbalance of said potentials, and means for indicating said mechanical impedance of said movable mechanical element in terms of said unbalanced potentials and said predetermined inertias and said compliances of said tuned elements.

8. Apparatus of the type described in claim 3 characterized in that said vibratory elements comprise a single elongated metallic member, and means supporting and driving said member at a node thereof.

9. Apparatus of the type described in claim 3 characterized in that said potential deriving means are supported by said vibratory device.

10. Apparatus for measuring the mechanical impedance of a sound translating element wherein said apparatus includes a vibratory driving device, means for connecting to said device a source of power for actuating said vibratory device at a predetermined frequency, a pair of similarly tuned vibratory elements having substantially equal predetermined inertias and compliances, one of said pair of vibratory elements having means adapted to receive said sound translating element to be measured, means including said driving device for providing forced vibration of both of said tuned elements, means for deriving potentials in response to said vibration of said tuned elements, means for balancing said potentials, means for supporting said sound translating element in operable relation with said one of said tuned elements to load said element to provide unbalance of said potentials, and means for indicating said mechanical impedance of said sound translating element in terms of said unbalanced potentials and said predetermined inertias and said compliances of said tuned elements.

ALPHA M. WIGGINS.